United States Patent [19]

Nakamura et al.

[11] 4,436,006
[45] Mar. 13, 1984

[54] METHOD FOR CUTTING LEAD WIRES

[75] Inventors: Hiromichi Nakamura; Haruya Urano; Tatsuo Kojima, all of Gifu; Mitsunao Sekiwa, Osaka, all of Japan

[73] Assignees: Matsushita Electric Industrial Co., Ltd., Osaka; Mitsubishi Metal Corporation, Tokyo, both of Japan

[21] Appl. No.: 189,299

[22] Filed: Sep. 22, 1980

Related U.S. Application Data

[63] Continuation of Ser. No. 972,066, Dec. 21, 1978, abandoned.

[30] Foreign Application Priority Data

Dec. 29, 1977 [JP] Japan .................................. 52-160008

[51] Int. Cl.³ ........................ B23D 19/00; B23D 35/00
[52] U.S. Cl. ............................................ 83/13; 83/174; 83/409.2; 83/411 R; 83/676
[58] Field of Search ...................... 83/174, 174.1, 676, 83/409.2, 411 R, 580, 13; 29/566.3

[56] References Cited

U.S. PATENT DOCUMENTS

| | | | |
|---|---|---|---|
| 1,607,879 | 11/1926 | Drucker | 83/676 |
| 2,619,142 | 11/1952 | Ditting | 83/676 X |
| 2,894,583 | 7/1959 | Johnstad | 83/676 X |
| 2,931,407 | 4/1960 | Erickson | 83/676 |
| 3,122,958 | 3/1964 | Washburn | 83/676 X |
| 3,541,910 | 11/1970 | Murray | 83/676 |
| 3,882,749 | 5/1975 | Tourek | 83/174 X |
| 3,894,462 | 7/1975 | Lundtoft | 83/676 X |
| 3,974,727 | 8/1976 | Stehlin | 83/174 |
| 4,072,077 | 2/1978 | Morgan | 83/409.2 X |
| 4,173,160 | 11/1979 | Hess | 83/174 |

FOREIGN PATENT DOCUMENTS

| | | | |
|---|---|---|---|
| 1177454 | 9/1964 | Fed. Rep. of Germany | 83/676 |
| 665983 | 2/1952 | United Kingdom | 83/676 |
| 883610 | 12/1961 | United Kingdom | 83/676 |

Primary Examiner—Frank T. Yost
Attorney, Agent, or Firm—Joseph W. Farley

[57] ABSTRACT

A cutting method comprising using a main body in the form of a circular disk and a hard layer provided on one surface of the main body and having a thickness of 0.02 to 0.2 mm. The hard layer is made of cemented carbides, TiC TaC, $Cr_2C_3$, $Al_2O_3$ or the like, while the main body is made of a material, such as steel, non-ferrous metal or plastics, which is lower than the hard layer in abrasion resistance. The hard layer is formed along its outer periphery with a cutting edge which is self-sharpened when chipped.

6 Claims, 5 Drawing Figures

METHOD FOR CUTTING LEAD WIRES

This is a continuation of application Ser. No. 972,066, filed Dec. 21, 1978 and now abandoned.

The present invention relates to a cutting device, and more particularly to a device for cutting lead wires.

Devices heretofore known for cutting lead wires comprise a disk-like main body and cemented carbide tips arranged on a surface of the main body along its outer periphery as will be described later in detail. Such devices have the drawback that they must be ground frequently because the tips, when chipped, become unable to cut lead wires smoothly.

The main object of the present invention, accomplished to overcome the above drawback, is to provide an inexpensive lightweight cutting device having a cutting edge which does not require resharpening even when chipped and which is capable of cutting lead wires efficiently.

To fulfill this object, the present invention provides a cutting device comprising a main body in the form of a circular disk and an annular hard layer provided on a surface of the main body and having a thickness of 0.02 to 0.2 mm and a cutting edge formed along the outer periphery of the hard layer.

Other features and advantages of this invention will become more apparent from the following description given with reference to the accompanying drawings, in which.

Figure 1:
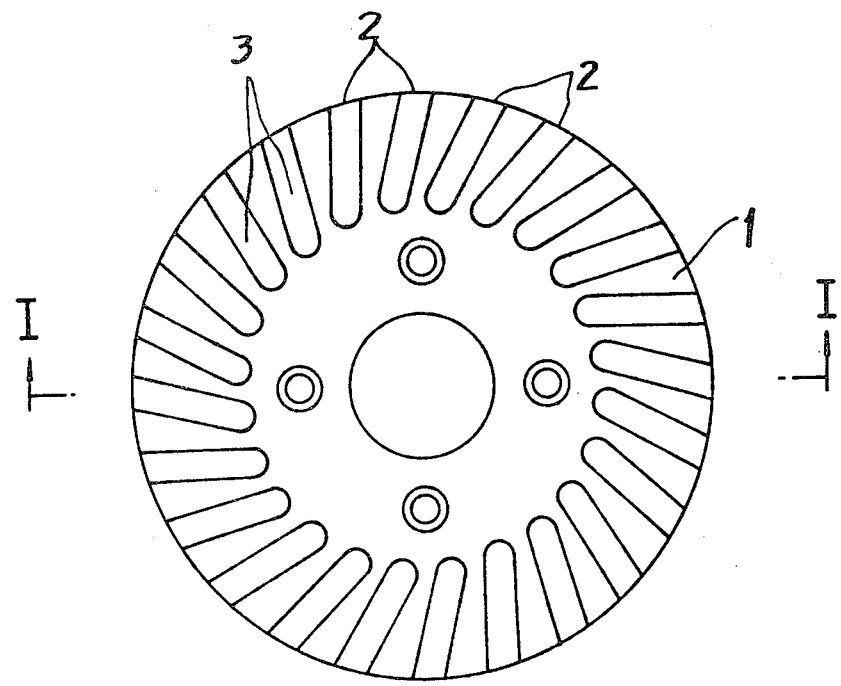
FIG. 1 is a plan view showing a conventional cutting device.
Figure 2:
FIG. 2 is a view in section taken along the line I—I in FIG. 1.

A conventional cutting device will be described first with reference to FIGS. 1 and 2. A main body 1 in the form of a circular disk is provided with cemented carbide tips 3 arranged on a surface of the main body 1 along its outer periphery. Each of the tips 3 is formed, at the radially outer end thereof, with a circular arc cutting edge 2 having a curvature equal to the outer peripheral curvature of the main body 1. The cutting device must be reground when the cutting edges have worn out by about 0.5 to about 0.6 mm for use with lead wires of 0.8 to 1.0 mm in diameter or by about 0.005 to about 0.5 mm for use with lead wires of less than 0.8 mm in diameter. Since the main body 1 is not formed with a continuous cutting edge over the entire periphery, the device has a low cutting efficiency. The device has another drawback that the use of the cemented carbide tips 3, which are relatively thick, renders the device costly and heavy.

Figure 3:
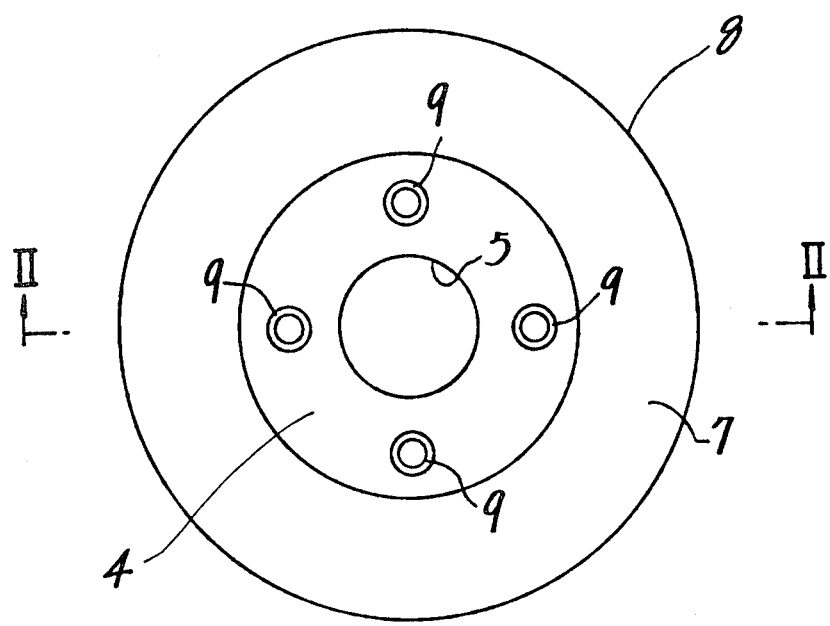
FIG. 3 is a plan view showing an embodiment of this invention.
Figure 4:
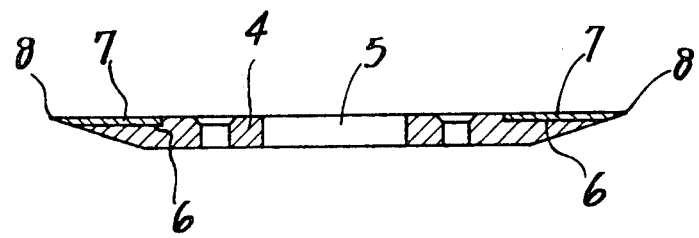
FIG. 4 is a view in section taken along the line II—II in FIG. 3.

These drawbacks have been overcome by the present invention which will be described below with reference to FIGS. 3 and 4 showing an embodiment.

A main body 4 in the form of a circular disk has a center bore 5 and an annular recess 6 formed in a surface thereof along its outer periphery. The main body 4 is made of a material having lower abrasion resistance than cemented carbides, such as carbon steel or like ferrous metal, aluminum alloy or like nonferrous metal, or phenolic resin or like plastics.

A thin annular plate of cemented carbides is bonded to the recessed portion 6 with an adhesive to provide a hard layer 7. The hard layer 7 has a cutting edge 8 formed along its outer periphery and projecting from the outer periphery of the main body 4. The hard layer 7 has a small thickness of 0.02 to 0.2 mm. Accordingly the cutting edge 8, when chipped, provides a fresh sharp cutting edge at the chipped portion and is thereby self-sharpened. This phenomenon differs from the "self-dressing" of whetstones. When the hard layer 7 has a thickness of larger than 0.2 mm, the cutting edge 8, even when chipped, will not be self-sharpened at the broken portion, whereas the hard layer 7, if having a thickness of less than 0.02 mm, will have reduced mechanical strength, making the cutting edge 8 unable to serve as such.

The main body 4 has mounting holes 9 arranged along a circumference about the center bore 5.

The cutting device of this invention will be used in the following manner for cutting lead wires.

Figure 5:
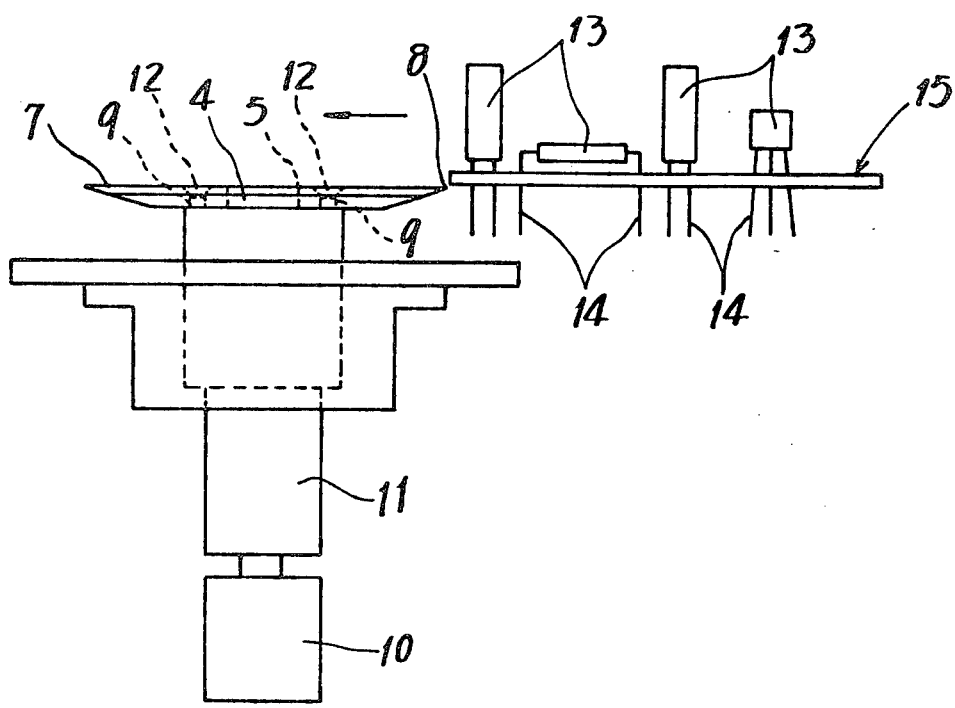
FIG. 5 is a side elevation showing the cutting device during use.

As seen in FIG. 5, the central bored portion 5 of the main body 4 is fitted to a small-diameter portion of one end of the shaft 11 of a motor 10, and bolts 12 passed through the mounting holes 9 of the main body 4 are screwed into the end of the shaft 11 to fasten the main body 4 to the shaft 11. The main body 4 is driven at a high speed by the motor 10. A print base panel 15 carrying capacitors and other electronic parts 13 on its upper surface with the lead wires 14 of the parts 13 projecting from the lower surface of the panel is fed to the device in the direction indicated by an arrow in FIG. 5, whereby the lead wires 14 are cut by the cutting edge 8 of the hard layer 7. The cutting edge 8 can cut the lead wires 14 free of any trouble even when chipped during the operation since the chipped portion serves as a fresh sharp edge portion.

An example of this invention will be described below.

A main body of phenolic resin was prepared which was 200 mm in outside diameter, 31.75 mm in inside diameter and 4.5 mm in thickness and had an annular recessed portion in a surface thereof along its outer periphery. An annular plate of cemented carbides, 200 mm in outside diameter, 160 mm in inside diameter and 0.09 mm in thickness, was bonded to the recessed portion with an epoxy adhesive. The outer periphery of the annular plate was thereafter ground to form a cutting edge and to obtain a cutting device.

Print base panels each having 500 lead wires were fed at a speed of 3 m/min to the cutting device driven at 7000 r.p.m. to cut the lead wires, with the result that it was possible to handle 48265 base panels. When a conventional cutting device was used for cutting lead wires under the same conditions as above, it became necessary to resharpen the cutting edge after handling 1000 print base panels.

The cutting device of this invention was found to have been worn away by 0.5 mm in outside diameter by cutting the lead wires of 1000 print base panels as is usually the case with the conventional cutting device, but the present device was found usable until the outside diameter reduced to 170 mm.

The optimum thickness of the cemented carbide annular plate was found to be 0.10 to 0.2 mm for cutting iron lead wires 0.8 to 1.0 mm in diameter or 0.02 to 0.09 mm for use with iron lead wires of less than 0.8 mm in diameter.

Although the hard layer comprises an annular plate of cemented carbides bonded to a surface of the main body according to the embodiment described above, the hard layer may be formed directly on the surface of the main body from TiC, TaC, $Cr_2C_3$ or $Al_2O_3$ by vacuum evaporation or cementation insofar as the hard layer provides a cutting edge which is capable of cutting lead wires and which, when chipped, gives a sharp broken portion.

With the device of this invention for cutting lead wires, the hard layer for providing a cutting edge has a specified small thickness of 0.02 to 0.2 mm as described above, so that the cutting edge can be self-sharpened by chipping during a cutting operation. The device therefore has the outstanding advantage of being usable without necessitating any resharpening procedure. When the conventional device has worn away in an amount of 0.5 mm, an allowance of about 0.5 mm is additionally needed for resharpening, each resharpening procedure thus entailing a reduction of about 1 mm in diameter. Assuming that a device of 200 mm in diameter is usable until it has worn away to a diameter of 170 mm, for example, the device can be resharpened only about 30 times, whereas the cutting device of this invention can be refreshed by chipping and thus self-sharpened by the cutting operation per se without necessitating any allowance for resharpening and is accordingly usable about twice as much as is conventionally possible. The present device consequently has a remarkably prolonged life for cutting a greatly increased quantity of lead wires.

With a lesser amount of cemented carbides used for the hard layer, the present device has a reduced weight of about 1/7 to about 1/10 the weight of the conventional device, can be made at a lower cost, is usable with a smaller drive shaft and a compacter motor and can be stopped more quickly when braked as compared with conventional like devices.

The cutting edge formed over the entire periphery of the main body affords another advantage that the device has a greatly improved cutting efficiency.

What is claimed is:

1. In a method of cutting lead wires projecting from one side of print base panels by relatively moving the panels and a rotating circular cutting disk having a peripheral cutting edge adapted to sever the lead wires, the improvement comprising the steps of
    providing the cutting disk with a main body and an annular hard layer of from 0.02 to 0.2 mm in thickness made from at least one material selected from the group consisting of cemented carbide, TiC, TaC, $Cr_2C_3$ and $Al_2O_3$, said hard layer forming said peripheral cutting edge and extending radially inwardly thereof, said main body having lower abrasion resistance than said hard layer; and
    severing the lead wires successively from a plurality of panels by rotating the cutting disk at a speed sufficiently high to cause the peripheral cutting edge to be self-sharpening by chipping of said hard layer from successive contacts with the lead wires.

2. A method according to claim 1 wherein the lead wires have a diameter of 0.8 to 1.0 mm and the hard layer provided on said cutting disk has a thickness of 0.10 to 0.2 mm.

3. A method according to claim 1 wherein the lead wires have a diameter of less than 0.8 mm and the hard layer provided on said cutting disk has a thickness of 0.02 to 0.09 mm.

4. A method according to claim 1, 2 or 3 wherein the cutting disk is rotated at a speed on the order of 7000 RPM.

5. A method according to claim 1 wherein the main body is provided with a surface disposed perpendicularly to the axis of rotation of the cutting disk and with an annular recess extending inwardly from the outer periphery of said surface, said hard layer being mounted in said recess with said cutting edge projecting from the outer periphery of said surface.

6. A method according to claim 5 wherein said hard layer is formed by an annular plate mounted in said recess.

* * * * *